Figure 1:
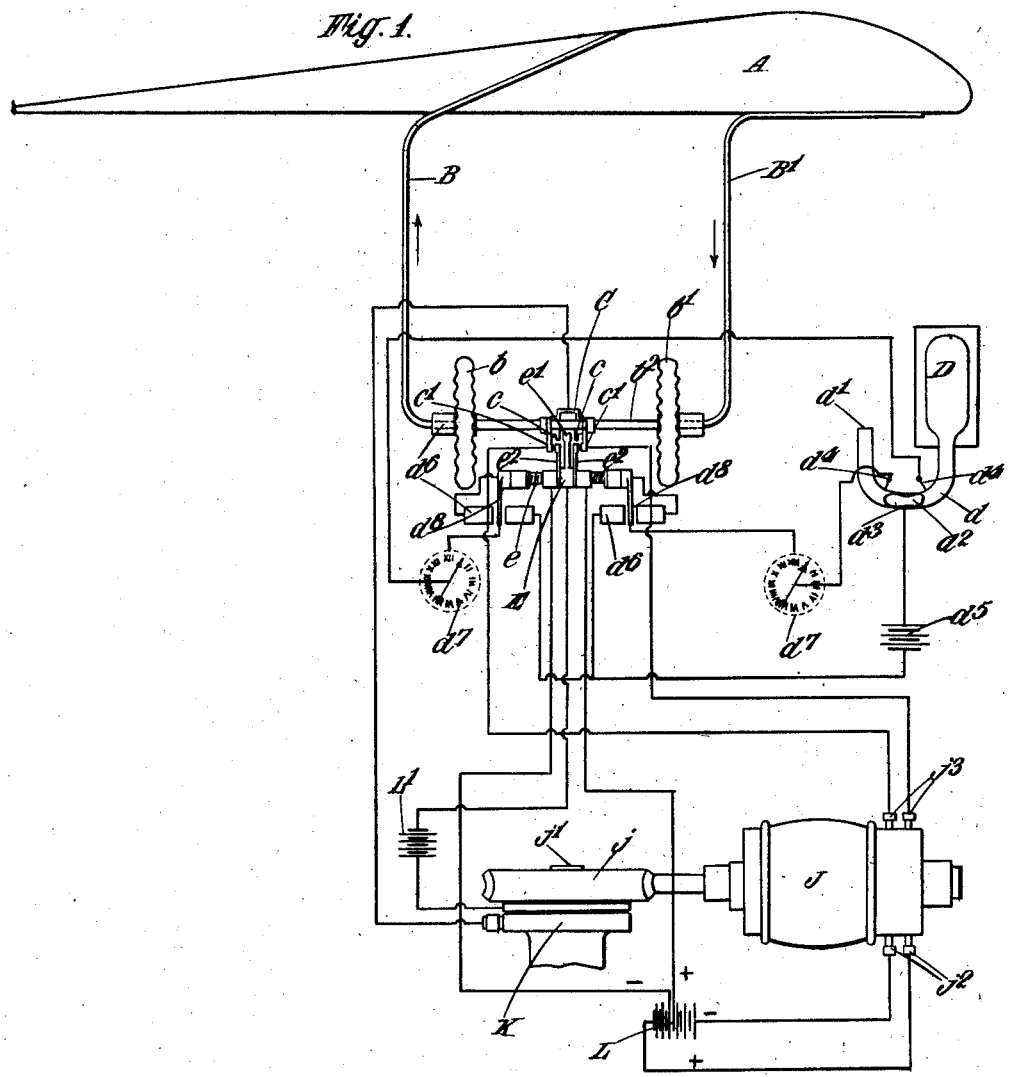

Dec. 15, 1925.

O. H. D. VICKERS 1,565,763

AUTOMATIC CONTROL OF AIRCRAFT

Filed May 8, 1923  3 Sheets-Sheet 1

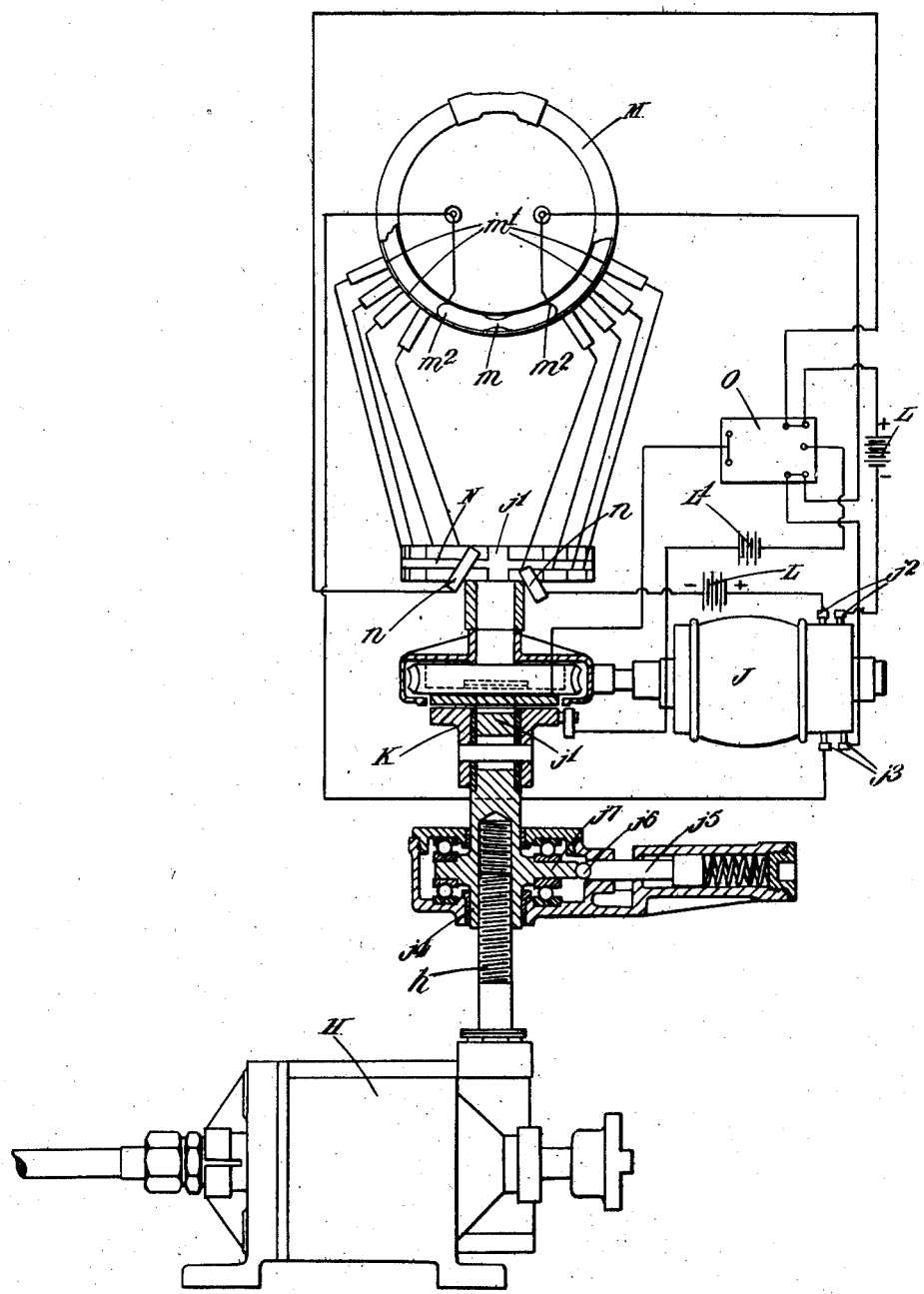

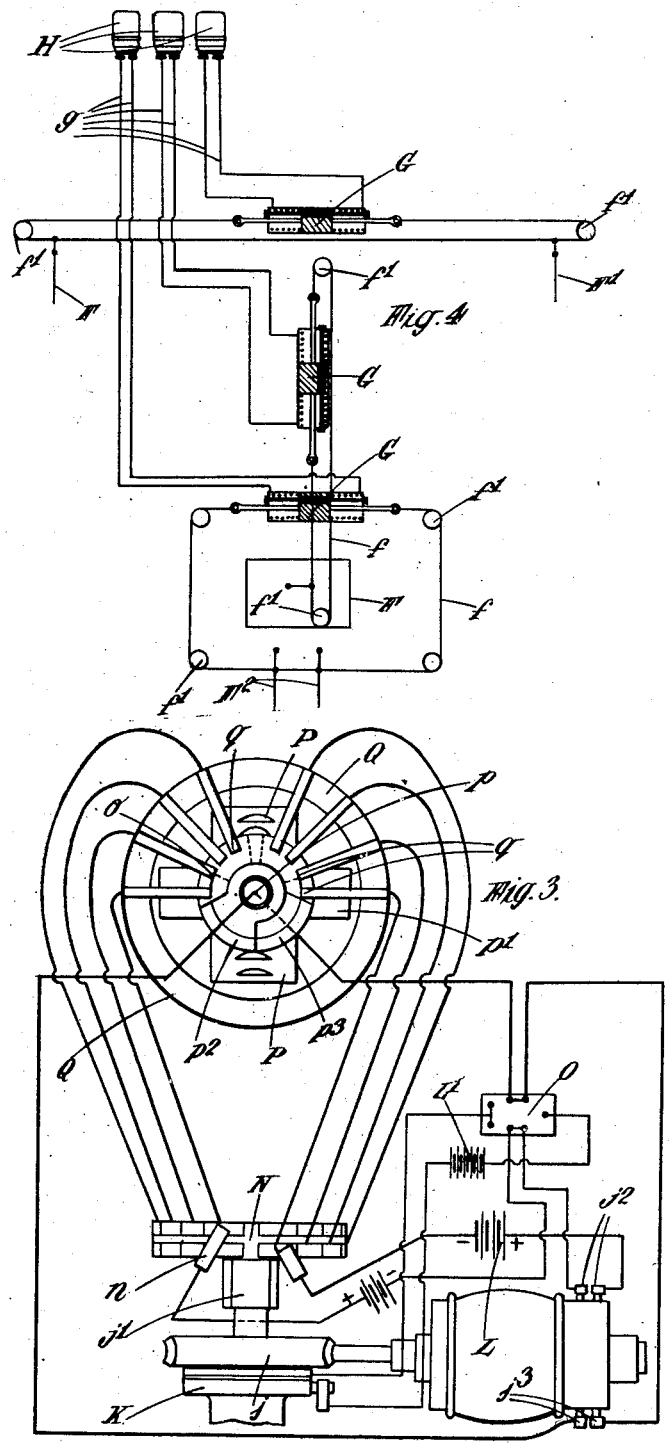

Patented Dec. 15, 1925.

1,565,763

UNITED STATES PATENT OFFICE.

OLIVER HENRY DOUGLAS VICKERS, OF WESTMINSTER, ENGLAND, ASSIGNOR TO VICKERS LIMITED, OF WESTMINSTER, ENGLAND, A BRITISH COMPANY.

AUTOMATIC CONTROL OF AIRCRAFT.

Application filed May 8, 1923. Serial No. 637,424.

*To all whom it may concern:*

Be it known that I, OLIVER HENRY DOUGLAS VICKERS, a subject of the King of Great Britain, residing at Vickers House, Broadway, Westminster, in the county of London, England, have invented certain new and useful Improvements in or Relating to the Automatic Control of Aircraft, of which the following is a specification.

This invention relates to the automatic control of aircraft, in which the three kinds of control, fore and aft, lateral and directional, are effected by devices depending for their operation on the different kinds of deviation of the aircraft from the correct flight.

According to this invention a servo-motor system comprising separate servo-motor units for the different control operations is under the control respectively of an air pressure device for fore and aft correction, a pendulum device for lateral correction and gyroscopic device for directional correction or the maintaining of straight flight. Any deviation from the set course or level is immediately corrected by one or more of the governing devices, ensuring straight flight with absence of side slipping or substantial variation in height, without attention from the pilot or putting any appreciable stress on the governing devices themselves, the power required for control being obtained from the servo-motor system.

The servo-motor is preferably one comprising a small pump unit of the variable delivery kind, as employed for example in the Williams-Janney hydraulic gear and a motor unit which gives a control movement on either side of a mean position, according to the regulation of the delivery control of the pump unit.

The variable delivery mechanism of the pump is operated by a reversible electric motor in a circuit made and broken under the action of the corresponding automatically operated control mechanism and preferably having a follow-up contact device which automatically breaks the motor circuit and is returned to neutral position at the end of a predetermined movement. The reversible motor is connected to the pump control through a reducing gearing and a clutch brought into operation on the closing of the motor circuit, the pump control being operated in either direction according to the circuit contacts which are closed by the automatic control apparatus.

The motor unit of the gear may be of any convenient type, and may comprise a double acting ram having a spring controlled plunger or piston and provided with a leak adapted to give a variable choking action so that the position of the plunger and the force employed are determined by the rate of delivery of the pump. Hunting gear of known type may be associated with the ram.

The pendulum device for lateral correction preferably comprises an annular or curved tube with a mercury globule flowing to one side or the other under gravity to meet one or more of a series of contacts on either side closing the reversible motor circuit and providing for a smaller or larger motor movement according to the angle through which the mercury moves.

The gyroscopic device for direction correction is of the type employed in rate of turn indicators, comprising a gyro wheel mounted in a spring controlled frame adapted to precess around a horizontal axis against the force of the spring, the precessional movement effecting the closing of the motor circuit on either side through suitable contacts.

In order that the said invention may be clearly understood and readily carried into effect, the same will now be described more fully with reference to the accompanying drawings, in which:—

Figures 1, 2 and 3 are diagrams illustrating the three kinds' of automatic control which are combined in the complete apparatus, Figure 1 showing the air pressure operated fore and aft control apparatus, Figure 2 the pendulum operated apparatus, the pendulum comprising a mercury globule in an annular tube having electrical contacts on either side and serving for lateral correction, and Figure 3 the gyroscopic directional control for maintaining straight flight; and Figure 4 is a general diagram of the pump and motor units with the connections to the respective control surfaces of the aircraft.

Referring first to the air pressure fore and aft control apparatus of Figure 1, the general arrangement of this corresponds to the combined differential air pressure apparatus and statoscope described in the specification of my application for Patent No. 17,584 of 1922.

A is the aeroplane wing or aerofoil shown in outline. B, B¹ are air tubes opening respectively through the upper surface of the wing, considerably behind the leading edge, and forwardly immediately below the leading edge, so that during the flight of the aeroplane the air in the two tubes is subjected respectively to variable suction and variable positive pressure. $b$, $b^1$ are air boxes of the type used in aneroid barometers, open respectively to the two air tubes and connected together by the adjustable tubular connection $b^2$, carrying an adjustable contact making device C comprising in the arrangement shown four contacts.

D is the statoscope air chamber terminating in the U tube $d$, the end $d^1$ of which is open to the atmosphere. A mercury globule $d^2$ lies in the lowest part of the tube $d$ which, as shown, is contracted at the part receiving the globule so that it swells out on either side. Circuit contacts $d^3$, $d^4$ lead into the tube respectively at the centre and at a little distance from each end of the mercury globule so that a small displacement of the globule will make contact on either side. The contact $d^3$ is connected up to the battery $d^5$ and through this to the two pairs of electro-magnets $d^6$, while the side contacts are connected up to clocks $d^7$ provided with a series of contact strips which close the statoscope circuit only at predetermined intervals so that the statoscope is brought into operation intermittently to correct for any upward or downward movement of the aircraft and assist in keeping it at a constant level.

Associated with the contact device C carried by the air boxes $b$, $b^1$ is an adjustable contact device E, mounted on a quick pitch screw $e$ and comprising a central contact $e^1$ and side contacts $e^2$ adapted to make contact alternatively with the inner and outer contacts $c$, $c^1$, which device E is operated in either direction by the electro-magnets $d^6$ through armatures $d^8$ and suitable connections such as a pawl and ratchet wheel which enable the screw $e$ to be given a slight turn in either direction when the statoscope circuit is closed. On any differences in pressure arising between the external atmosphere and the interior of the statoscope chamber D the mercury globule $d^2$ is displaced in one direction or the other, meeting one or other of the side contacts $d^4$. If the clocks are in circuit closing position the electro-magnets $d^6$ are excited so as to operate the armatures $d^8$ in one direction or the other and turn the quick pitch screw $e$, displacing the neutral position of the contacts $e^1$, $e^2$ relatively to the co-operating contacts $c$, $c^1$. The differential air pressure in the tubes $b$, $b^1$, which varies with the angle of incidence of the aerofoil A, acting through the air boxes $b$, $b^1$, on any substantial alteration effects the closing of a controlling circuit at the contact devices C, E, and if the statoscope has displaced the neutral position of the contact device E to one side a smaller deviation in the variable air pressure acting in this direction will bring the two devices into contact, while for operation in the opposite direction a suitably larger change in the differential air pressure would be required, so that the statoscope acts to assist in maintaining a constant level.

The fore and aft control mechanism of the aircraft is of the usual type and is indicated diagrammatically in Figure 4, F being the horizontal control surface which is shown as connected by the flexible connection $f$ passing over pulleys $f^1$ to opposite ends of the hydraulic ram G, which in its turn is connected by pipes $g$ to the variable delivery pump unit H, which may be of the Williams-Janney type, the pump being continuously driven by any convenient source of power, such as a fan on the aircraft with or without an auxiliary motor, the pump delivery being controlled by the movement in one direction or the other of the reversible electric motor J, shown in Figure 1. The double-acting ram G is on the lines described in the specification of my Patent No. 188,944 and its operation on the control surface of the aircraft is as described in the specification of my application for Patent No. 30,031 of 1921. The arrangement is indicated in Figure 4 merely to show the general operation of the apparatus and forms no part of the present invention. The motor J drives the worm gear $j$ loose upon a spidle $j^1$, the gear being adapted to be clutched to the spindle by the magnetic clutch K, as will be described more fully in connection with Figure 2. The terminals $j^2$ are connected to the ends of the divided battery L from the centre of which pass leads to the side contacts $e^2$ of the contact device E, while the central contact $e^1$ is connected through the battery $L^1$ to the magnetic clutch K, the other lead from the clutch passing to the inner contacts $c$ of the contact device C. The terminals $j^3$ of the motor are connected up, respectively, to the two outer contacts $c^1$.

It will be seen that on contact being made in one direction or the other between the two contact devices C and E circuits are closed both through the motor and the magnetic clutch, so that the gear $j$ is clutched to the spindle, which in turn is operatively connected to the control spindle of the pump H and the motor turns in one direction or the other to cause the pump to deliver liquid through the ram circuit at a rate depending upon the displacement due to the motor. In the fore and aft control mechanism described in my specification No. 17,584 of 1922, already referred to, a follow-up electrical cut-out device is provided in the motor circuit, but this may be dispensed with and is not shown in Figure 1 of the present drawings, the motor circuit being broken when the statoscope control or the differential air pressure control depending on the angle of inclination of the aerofoil causes the contact devices C and E to move out of contact with each other.

In the arrangement shown in Figure 2 lateral correction, obtained, for example, through the wing tips or ailerons $F^1$ of Figure 4, is effected under the control of a pendulum device in the form of an annular tube M having a globule of mercury $m$ and a series of contacts $m^1$ at each side of the centre, so that if the mercury moves to one side or the other the circuit of the motor J is closed. The motor circuit in this case includes a follow-up contact device N mounted on the end of the spindle $j^1$ and connected through the brushes $n$ to the two motor terminals $j^2$ through the batteries L, which are indicated diagrammatically in two parts. In the motor circuit is provided the relay O and the magnetic clutch K is as shown connected up to this relay through the battery $L^1$ instead of as in Figure 1 being connected up to the controlling contact device directly. The connection between the motor gear and the pump unit H is shown in the figure, $h$ being the control spindle of the pump, which is screw threaded with a quick pitch thread and engages in the sleeve $j^4$ of the spindle $j^1$.

The second pair of terminals $j^3$ of the motor J are connected up to the mercury tube at the contacts $m^2$, one or other of which is normally in contact with the mercury and on any displacement of the mercury due to a lateral tilt of the aircraft in straight flight, or a tilt which does not correspond to the correct angle of banking during turning, the motor circuit is closed on one side or the other through one, two or more of the contacts $m^1$. The follow-up contact device N has segments corresponding to the contacts $m^1$ and when the motor circuit is closed on displacement of the mercury the motor turns the worm gear $j$ and, as the clutch K is at the same time operated through the relay O, the spindle $j^1$ is clutched to the gear and the pump control spindle $h$ is raised or lowered through the screwed sleeve $j^4$ and the control surfaces of the aircraft are operated through the pump and ram in the direction which corrects for the lateral tilt. When the follow-up contact device N has been turned through an angle depending upon how many of the contact segments are brought into action, the motor circuit is broken and the clutch released through the relay C, whereupon reaction of the pump H acting through the sleeve $j^4$ and spindle $j^1$ returns the follow-up device N to neutral position. If, however, the correction has not been sufficient the operation is repeated until the aircraft is brought level. A centralizing device comprising a spring pressed plunger $j^5$ with ball $j^6$ and a notched disc $j^7$ on the sleeve $j^4$ ensures the follow-up device and sleeve stopping at the neutral position.

Referring now to Figure 3, which illustrates the gyroscopic control for directional correction for the maintaining of straight flight effected through the control surfaces or rudders $F^2$ indicated in Figure 4, the arrangement of motor, motor contacts and connections to the pump are on the lines described with respect to Figure 2, but in place of the mercury contact device of Figure 2, and acting in substantially the same manner so far as the electrical circuits are concerned, a gyro wheel P mounted to precess around the horizontal axis $p$ in the gimbal or supporting ring $p^1$ has its precessional movement opposed by springs in the known manner. The gyroscope is of the type employed in rate of turn indicators, for example, as described in the specification of Patent No. 164,396 (G. H. Reid). Any turning movement of the aircraft causes the gyro axis to turn as this is fixed relatively to the aircraft and is horizontal, so that the horizontal component of any turning movement is effective in causing a precessional movement of the gyro wheel P. As this precessional movement around the axis is resisted by resilient pressure in either direction the wheel P will be displaced through an angle which varies with the rate of turn of the aircraft. The gyro wheel casing carries contact surfaces $p^2$, $p^3$ adapted to be moved under one, two or more of the stationary contacts $q$ carried by the fixed ring Q, which contacts $q$ are as shown connected up to the follow-up contact device N of the motor, the terminals $j^3$ of the motor being connected up as shown to the moving contact surfaces $p^2$, $p^3$. Any turning movement of the aircraft will therefore, bring one or other of the contact surfaces $p^2$, $p^3$ under a contact or contacts $q$ at the same side and the motor circuit will be closed and the magnetic clutch actuated so as to cause the pump to deliver into the motor or ram circuit and effect the movement of the rudders $F^2$ through an angle depending upon the adjustment of the pump and consequently upon the extent of movement of the motor, which finally depends upon the extent of the precessional movement of the gyroscope. As soon as the turning movement ceases the gyroscope is brought back to its normal neutral position and the motor circuit is broken whether or not the circuit has already been broken at the follow-up contact device N. As soon as the motor circuit is broken and the clutch released the pump returns to its normal non-delivery position and the rudders F² are consequently brought back to their neutral position under the control of the centralizing springs of the hydraulic rams or any equivalent mechanism which may be employed.

What I claim and desire to secure by Letters Patent of the United States is:—

1. In automatic aircraft control apparatus, primary control mechanism, a reversible rotary electric motor, a motor contact device operated by the said primary control mechanism and adapted to support the said rotary motor in either direction, and a variable hydraulic pump and motor system having its liquid flow regulated by the said electric motor, the said hydraulic system being adapted to effect the operation of the aircraft control, and a follow-up contact device by which the electric motor circuit is broken after a predetermined movement of the rotary motor.

2. In automatic aircraft control apparatus as in claim 1, means operated by the reaction of the variable pump control whereby the said follow-up device is returned to normal position after displacement.

3. In a directional control apparatus for aircraft, a gyroscopic wheel mounted for precession around a horizontal axis under resilient restraint, an electric motor, a hydraulic servo-motor unit adapted to actuate the control surfaces of the aircraft and itself controlled by the said electric motor, a follow-up contact device in the reversible motor circuit, a plurality of contacts connected up to the corresponding segments in the follow-up device and co-operating contacts displaced on precessional movement of the gyro wheel, for the purpose specified.

4. In automatic aircraft control apparatus, primary control mechanism, an electric motor, a motor contact device operated by the said primary control mechanism, a variable hydraulic pump and motor system, a pump control member, a clutch between the said control member and the motor whereby the motor can operate the said member on the clutch being thrown in and a motor driven follow-up contact device in the motor circuit, for the purpose specified.

5. In aircraft control apparatus as in claim 4, means for electrically throwing in the said clutch on the motor circuit being closed.

6. In aircraft control apparatus as in claim 4, worm gearing driven by the said electric motor and nut and screw gearing for the pump control member, the aforesaid clutch being interposed between the said worm gearing and the nut and screw gearing.

OLIVER HENRY DOUGLAS VICKERS.